(12) United States Patent
Jung et al.

(10) Patent No.: US 11,514,351 B2
(45) Date of Patent: Nov. 29, 2022

(54) APPARATUS AND METHOD FOR OPTIMIZING QUANTUM COMPUTATION

(71) Applicant: SAMSUNG SDS CO., LTD., Seoul (KR)

(72) Inventors: Ji Won Jung, Seoul (KR); Jae Young Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 417 days.

(21) Appl. No.: 16/883,304

(22) Filed: May 26, 2020

(65) Prior Publication Data

US 2021/0350265 A1   Nov. 11, 2021

(30) Foreign Application Priority Data

May 11, 2020   (KR) .................. 10-2020-0056045

(51) Int. Cl.
   *G06N 10/00*        (2022.01)
(52) U.S. Cl.
   CPC .................... *G06N 10/00* (2019.01)

(58) Field of Classification Search
   CPC ......... G06N 10/00; G06N 10/20; B82Y 10/00
   See application file for complete search history.

(56) References Cited

U.S. PATENT DOCUMENTS

2020/0057957 A1*   2/2020   Johnson ................. G06N 10/40
2020/0175413 A1*   6/2020   Hsu ........................ G06F 17/11

\* cited by examiner

*Primary Examiner* — Daniel D Chang
(74) *Attorney, Agent, or Firm* — The PL Law Group, PLLC

(57) ABSTRACT

An apparatus for optimizing quantum computation according to an embodiment includes a block generation module that identifies a portion requiring quantum computation from an input problem and generates a quantum calculation block from the identified portion, a block map management module that stores and manages a quantum computation block map including the generated quantum calculation block information, and a calculator determination module that determines a quantum calculator, which is to execute the quantum calculation block, among a plurality of quantum calculators including one or more quantum simulators and one or more quantum computers.

18 Claims, 5 Drawing Sheets

102

APPARATUS AND METHOD FOR OPTIMIZING QUANTUM COMPUTATION

CROSS REFERENCE TO RELATED APPLICATIONS AND CLAIM OF PRIORITY

This application claims the benefit of Korean Patent Application No. 10-2020-0056045 filed on May 11, 2020 in the Korean Intellectual Property Office, the disclosure of which is incorporated herein by reference in its entirety.

TECHNICAL FIELD

Embodiments disclosed herein relate to a technology for optimizing quantum computation for any problem including the quantum computation.

BACKGROUND ART OF THE INVENTION

Quantum computing refers to a method of processing data, utilizing quantum mechanical phenomena such as quantum entanglement or superposition. For quantum computing, a quantum calculator, such as a quantum computer or a quantum simulator, on which a quantum algorithm can run is required. The quantum computer is implementation of quantum computing on actual hardware. The quantum simulator is virtual implementation of the quantum computer on a classical computer. The quantum computer can perform parallel operations on multiple qubits, but, at the current level, has a high error rate and a limited number of available resources. On the other hand, the quantum simulator has a low error rate and a high speed, but has a limited number of qubits capable of being operated.

Conventionally, quantum computation was performed by a user directly selecting a calculator (quantum computer or quantum simulator) which is to perform quantum computation. However, in this case, since characteristics of the quantum computation cannot be properly reflected in a selection process, it is difficult to efficiently perform the quantum computation. Accordingly, there is a need for a method for effectively selecting an optimum calculator which is to perform quantum computation.

SUMMARY

Embodiments disclosed herein provide technical means for identifying a quantum computation portion for any problem including quantum computation and optimizing processing of the identified quantum computation portion.

According to an exemplary embodiment, there is provided an apparatus for optimizing quantum computation including a block generation module that identifies a portion requiring quantum computation from an input problem and generates a quantum calculation block from the identified portion, a block map management module that stores and manages a quantum computation block map including the generated quantum calculation block information, and a calculator determination module that determines a quantum calculator, which is to execute the quantum calculation block, among a plurality of quantum calculators including one or more quantum simulators and one or more quantum computers.

The quantum calculation block information may include a type of quantum computation, connection information with other quantum calculation blocks, an expired time, and quantum calculator information, which is to execute the quantum calculation block, that are included in the quantum calculation block.

When previous quantum calculation block information substantially the same as the quantum calculation block exists in the quantum computation block map, the calculator determination module may determine calculator information included in the previous quantum block information as a quantum calculator which is to execute the quantum calculation block.

When the previous quantum calculation block information substantially the same as the quantum calculation block does not exist in the quantum computation block map, the calculator determination module may calculate processing prediction time ($TEPT_S$) of each of the one or more quantum simulators, processing prediction time ($TEPT_C$) of each of the one or more quantum computers, and an error prediction amount (TEEA) of each of the one or more quantum computers for the quantum calculation block.

The calculator determination module may select any one of the one or more quantum computers and, when the processing prediction time ($TEPT_C$) of the selected quantum computer is equal to or greater than a minimum value of the processing prediction time ($TEPT_S$) of each of the one or more quantum simulators, determine the quantum simulator corresponding to the minimum value as a quantum calculator which is to execute the quantum calculation block.

When the processing prediction time ($TEPT_C$) of the selected quantum computer is less than the minimum value of the processing prediction time ($TEPT_S$) of each of the one or more quantum simulators, the calculator determination module may determine whether or not the error prediction amount (TEEA) of the selected quantum computer satisfies an error threshold range.

When the determination result satisfies the error threshold range, the calculator determination module may determine the selected quantum computer as a quantum calculator which is to execute the quantum calculation block.

When the determination result does not satisfy the error threshold range, the calculator determination module may reselect one of the remaining quantum computers and compare the processing prediction time ($TEPT_C$) of the reselected quantum computer with the minimum value of the processing prediction time ($TEPT_S$) of each of the one or more quantum simulators.

When the quantum computer to be reselected does not exist, the calculator determination module may determine the quantum simulator corresponding to the minimum value as a quantum calculator which is to execute the quantum calculation block.

According to an exemplary embodiment, there is provided a method for optimizing quantum computation, as a method performed in a computing device including one or more processors and a memory storing one or more programs executed by the one or more processors, the method including identifying a portion requiring quantum computation from an input problem and generating a quantum calculation block from the identified portion, determining a quantum calculator, which is to execute the quantum calculation block, among a plurality of quantum calculators including one or more quantum simulators and one or more quantum computers; and recording quantum calculation block information including the determined quantum calculator information in a quantum computation block map.

The quantum calculation block information may include a type of quantum computation, connection information with other quantum calculation blocks, an expired time, and information of a quantum calculator, which is to execute the quantum calculation block, that are included in the quantum calculation block.

In the determining of the quantum calculator, when previous quantum calculation block information substantially the same as the quantum calculation block exists in the quantum computation block map, calculator information included in the previous quantum block information may be determined as a quantum calculator which is to execute the quantum calculation block.

The determining of the quantum calculator may further include, when the previous quantum calculation block information substantially the same as the quantum calculation block does not exist in the quantum computation block map, calculating processing prediction time ($TEPT_S$) of each of the one or more quantum simulators, processing prediction time ($TEPT_C$) of each of the one or more quantum computers, and an error prediction amount (TEEA) of each of the one or more quantum computers for the quantum calculation block.

The determining of the quantum calculator is configured such that any one of the one or more quantum computers is selected and, when the processing prediction time ($TEPT_C$) of the selected quantum computer is equal to or greater than a minimum value of the processing prediction time ($TEPT_S$) of each of the one or more quantum simulators, the quantum simulator corresponding to the minimum value is determined as a quantum calculator which is to execute the quantum calculation block.

The determining of the quantum calculator may be configured such that, when the processing prediction time ($TEPT_C$) of the selected quantum computer is less than the minimum value of the processing prediction time ($TEPT_S$) of each of the one or more quantum simulators, it is determined whether or not the error prediction amount (TEEA) of the selected quantum computer satisfies an error threshold range.

The determining of the quantum calculator may be configured such that, when the determination result satisfies the error threshold range, the selected quantum computer is determined as a quantum calculator which is to execute the quantum calculation block.

The determining of the quantum calculator may be configured such that, when the determination result does not satisfy the error threshold range, one of the remaining quantum computers is reselected and the processing prediction time ($TEPT_C$) of the reselected quantum computer is compared with the minimum value of processing prediction time ($TEPT_S$) of each of the one or more quantum simulators.

The determining of the quantum calculator may be configured such that, when the quantum computer to be reselected does not exist, the quantum simulator corresponding to the minimum value is determined as a quantum calculator which is to execute the quantum calculation block.

According to disclosed embodiment, it is possible to improve performance of quantum computation by allocating an optimum quantum calculator to the quantum computation in consideration of characteristics of the quantum computation and available quantum calculator. Furthermore, according to disclosed embodiment, it is possible to save resources consumed in determining an optimum quantum calculator by reusing the existing optimization results using the quantum computation block map.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "comprising" are intended to indicate any property, number, step, element, and some or combinations thereof, and such expressions should not be interpreted to exclude the presence or possibility of one or more other properties, numbers, steps, elements other than those described, and some or combinations thereof.

Figure 1:
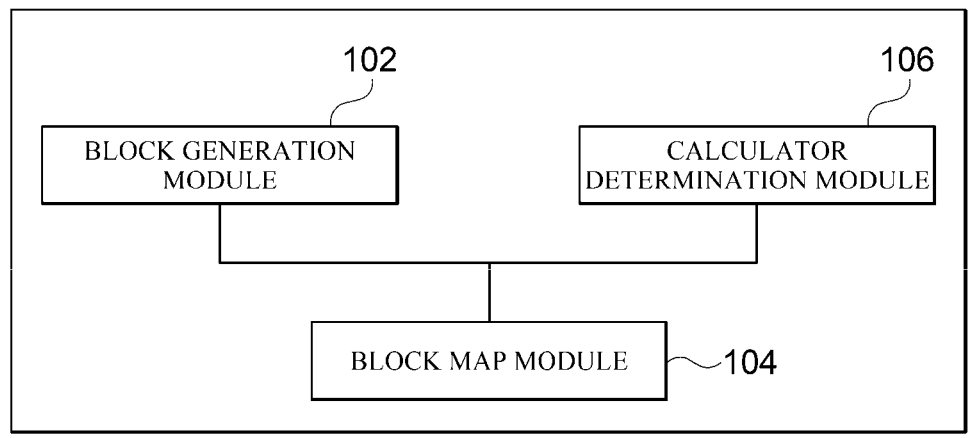
FIG. 1 is a block diagram illustrating an apparatus for optimizing quantum computation according to an embodiment.

FIG. 1 is a block diagram illustrating an apparatus 100 for optimizing quantum computation according to an embodiment. As illustrated, the apparatus 100 for optimizing quantum computation according to the embodiment includes a block generation module 102, a block map management module 104, and a calculator determination module 106.

Figure 2:
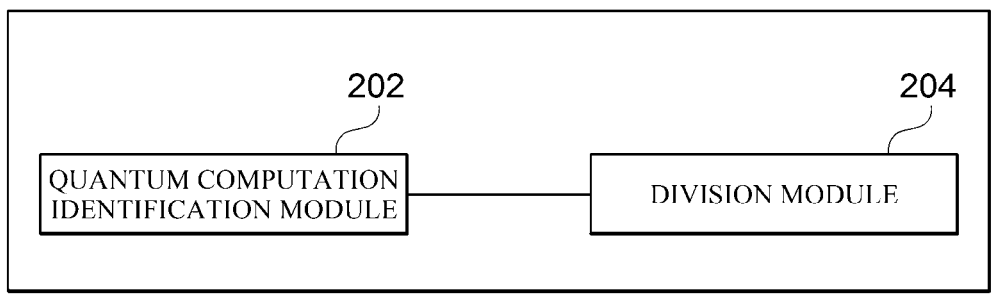
FIG. 2 is a block diagram illustrating a detailed configuration of a block generation module according to an embodiment.

The block generation module 102 identifies a portion requiring quantum computation from the input problem and generates one or more quantum calculation blocks from the identified portion. FIG. 2 is a block diagram for illustrating a detailed configuration of the block generation module 102 according to an embodiment. As illustrated, the block generation module 102 according to the embodiment may include a quantum computation identification module 202 and a division module 204.

The quantum computation identification module 202 identifies a region requiring quantum computation of the input problem, through a code analysis of the input problem. The input problem may be composed of a plurality of program execution codes, and the quantum computation identification module 202 may identify a code region requiring quantum computation among the plurality of program execution codes. For example, the quantum computation identification module 202 may determine a region that includes a program code for calling a quantum computation application programming interface (API) or a library of the problem described above as a code region requiring quantum computation. The quantum computation identification module 202 extracts the identified region to construct a quantum calculation block. The quantum computation identification module 202 replaces the extracted region of the input problem program code with a link for connecting to the quantum calculation block.

The division module 204 divides the quantum calculation block generated by the quantum computation identification module 202 into a plurality of blocks. In one embodiment, the division module 202 may divide qubits used in the existing quantum calculation block or quantum gates requiring operation into multiple quantum calculation blocks when the number of the qubits or the number of the quantum gates requiring the operation is too large. Due to the property of the quantum computation, quantum computation has characteristics that the time required and the amount of error increase as the amount of operation increases. Accordingly, when the quantum calculation block is divided, the divided blocks can be calculated through different quantum calculators, and thus performance and accuracy of quantum computation can be improved. In one embodiment, when dividing one quantum calculation block into a set of a plurality of blocks, the division module 204 can determine whether or not a result obtained by combining calculation results of the divided blocks is the same as a calculation result of the one quantum calculation block before, and perform block division only when the combined result and the calculation result are the same. The divided blocks can be connected to the block before division in a graph form.

Returning to FIG. 1 again, the block map management module 104 stores and manages a quantum computation block map. The quantum computation block map may be configured in a list form including information of one or more quantum calculation blocks generated by the block generation module 102. In this case, the quantum calculation block information may include quantum computation to be performed for each quantum calculation block (for example, quantum circuit information, etc.), connection information with other quantum calculation blocks, expired time, and quantum calculator information allocated to perform the quantum computation.

When the quantum calculation block is generated by the block generation module 102 and the quantum calculator, which is to perform each quantum calculation block, is determined through the calculator determination module 106 to be described later, the block map management module 104 adds quantum calculation block information including the quantum calculator information to the quantum computation block map.

As described above, each quantum calculation block information includes an expired time. In this case, the expired time may be set in consideration of the quantum computation to be performed and performance of a quantum calculator. The block map management module 104 determines whether or not quantum calculation block information whose expired time has arrived exists every preset update period, and deletes the expired quantum calculation block information. The reason for including the expired time in the quantum calculation block information as described above is that previous quantum calculation block information may not always guarantee optimum performance due to the property of quantum computation.

Next, the calculator determination module 106 determines an optimum quantum calculator, which is to perform actual quantum computation, for each of the one or more quantum calculation blocks generated by the block generation module 102. In one embodiment, the quantum calculator may include one or more quantum simulators and one or more quantum computers, and each quantum simulators and quantum computers may have different characteristics and capabilities. The calculator determination module 106 may allocate one quantum calculator of the quantum simulators and quantum computers to each block in consideration of characteristics of each quantum calculation block.

When a new quantum calculation block is input, the calculator determination module 106 may first search for the quantum computation block map and determine whether or not previous quantum calculation block information substantially the same as the quantum calculation block exists in the quantum computation block map. In the disclosed embodiment, the meaning of "substantially the same" includes the same information as the input quantum calculation block information, as well as the quantum calculation block information in which a difference from the input quantum calculation block information falls within a certain range. For example, while performing the same or similar quantum computation with the input quantum calculation block, the calculator determination module 106 may search for the presence or absence of previous quantum block information in which the number of qubits and the type of quantum gates, etc., are the same or within a predetermined error range. When previous quantum block information that satisfies the search result condition exists, the calculator determination module 106 may equally allocate the quantum calculator information allocated to the searched previous quantum block information to the new quantum calculation block. As described above, when the reusable block information exists using the quantum computation block map, the calculator determination module 106 may effectively reduce the operation cost required to determine the optimum quantum calculator for each quantum calculation block by reusing reusable block information.

When reusable quantum calculation block information does not exist as a result of the block map search, the calculator determination module 106 determines an optimum quantum calculator in consideration of the characteristics of the input quantum calculation block. In one embodiment, the calculator determination module 106 may use the following pieces of information for quantum calculator determination.

width of quantum circuit: the total number of qubits used in a quantum calculation block depth of quantum circuit: the total number of time slices to which a quantum gate is applied in a quantum calculation block number of qubits: the number of qubits that can be processed by a quantum computer and quantum hardware qubit lifetime: information duration of physical qubits qubit fidelity: stability of errors of physical qubits (calculation accuracy)

gate operation time: time required to process qubit information connectivity: connectivity of qubits provided by a quantum computer. Whether a connection relationship between various qubits is whole or partial, etc.

Specifically, the calculator determination module 106 calculates the followings for the input quantum calculation block.

processing prediction time ($TEPT_S$) of each quantum simulator: It refers to the prediction time taken until each quantum simulator is requested to execute the quantum calculation block and the result of execution of the quantum calculation block is provided from each quantum simulator. The processing prediction time (TEPT$_S$) of the quantum simulator can be derived based on an mathematical expression that takes the number of qubits of the quantum calculation block, the number of quantum gates, the width of the quantum circuit, the depth of the quantum circuit, and the gate operation time as parameters.

processing prediction time (TEPT$_C$) of each quantum computer: It refers to the prediction time taken until each quantum computer is requested to execute the quantum calculation block and the result of execution of the quantum calculation block is provided from each quantum computer. The processing prediction time (TEPT$_C$) of the quantum computer may be derived through an mathematical expression in which a queuing time is added to the parameters of the quantum simulator.

error estimation amount (TEEA) of each quantum computer: It refers to a prediction value for an error that will occur while a quantum calculation block is being executed, and is derived only from the quantum computer. The error estimation amount (TEEA) can be derived based on a mathematical expression that takes the number of qubits, the number of quantum gates, the width of the quantum circuit, the depth of the quantum circuit, the lifetime of the qubit, gate reliability (qubit fidelity), and the connectivity as parameters.

Then, the calculator determination module 106 selects any one of the one or more quantum computers and compares the processing prediction time (TEPT$_C$) of the selected quantum computer with the minimum value (min (TEPT$_S$)) of each processing prediction time (TEPT$_S$) of the quantum simulator.

When the processing prediction time (TEPT$_C$) of the selected quantum computer is equal to or greater than the minimum value of the processing prediction time (TEPT$_S$) of each of the quantum simulators, that is, when the following condition is satisfied, $$\text{TEPT}_C \geq \min(\text{TEPT}_S)$$

The calculator determination module 106 determines a quantum simulator having the minimum processing prediction time (TEPT$_S$) as a quantum calculator which is to perform the quantum calculation block.

In contrast, when the processing prediction time (TEPT$_C$) of the selected quantum computer is less than the minimum value of the processing prediction time (TEPT$_S$) of each of the quantum simulators, that is, when the following condition is satisfied, $$\text{TEPT}_C < \min(\text{TEPT}_S)$$

The calculator determination module 106 determines whether or not the error estimation amount (TEEA) of the selected quantum computer satisfies a preset error threshold range (ETR). The error threshold range (ETR) may be appropriately determined according to the problem to be solved and the characteristics of the quantum calculator.

As a result of the determination, when the error prediction amount (TEEA) of the selected quantum computer satisfies the error threshold range (ETR), the calculator determination module 106 determines the selected quantum computer as a quantum calculator which is to perform the quantum calculation block. In contrast, as a result of the determination, when the error estimation amount (TEEA) of the selected quantum computer does not satisfy the error threshold range (ETR), the calculator determination module 106 repeats a process of reselecting one of the remaining quantum computers and comparing the selected quantum computer to the minimum value of the processing prediction time (TEPT$_S$) of the quantum simulator. When a selectable quantum computer does not exist anymore, the calculator determination module 106 determines a quantum simulator having the smallest processing prediction time (TEPT$_S$) as a quantum calculator which is to perform the quantum calculation block.

Figure 3:
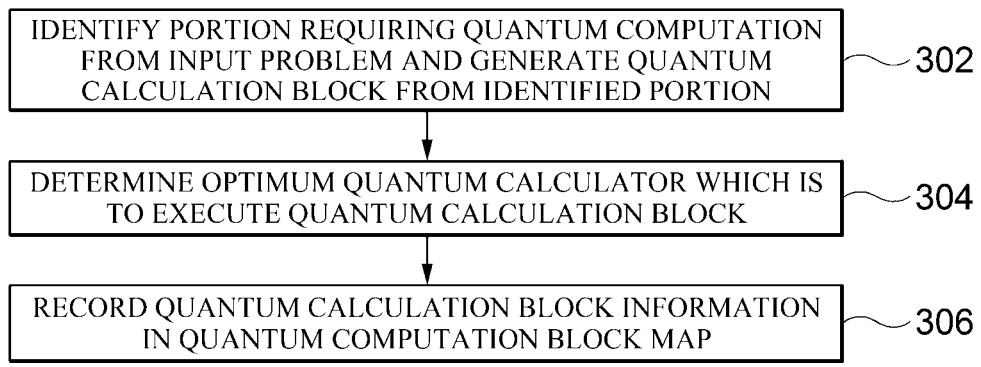
FIG. 3 is a flowchart illustrating a method for optimizing quantum computation according to an embodiment.

FIG. 3 is a flowchart illustrating a method 300 for optimizing quantum computation according to an embodiment. The illustrated flowchart may be performed by a computing apparatus having one or more processors and a memory storing one or more programs executed by the one or more processors, for example, the apparatus 100 for optimizing quantum computation described above. In the illustrated flowchart, the method or process is described as being divided into a plurality of steps, but at least some of the steps may be performed by changing the order, may be performed in combination with other steps, may be omitted, may be performed by being divided into detailed steps, or may be performed by adding one or more steps (not illustrated) thereto.

In step 302, the block generation module 102 identifies a portion requiring quantum computation from the input problem and generates one or more quantum calculation blocks from the identified portion.

In step 304, the calculator determination module 106 determines an optimum quantum calculator, which is to execute the quantum calculation block, among a plurality of quantum calculators including one or more quantum simulators and one or more quantum computers.

In step 306, the block map management module 104 records quantum calculation block information including the quantum calculator information determined in step 304 in a quantum computation block map.

Figure 4:
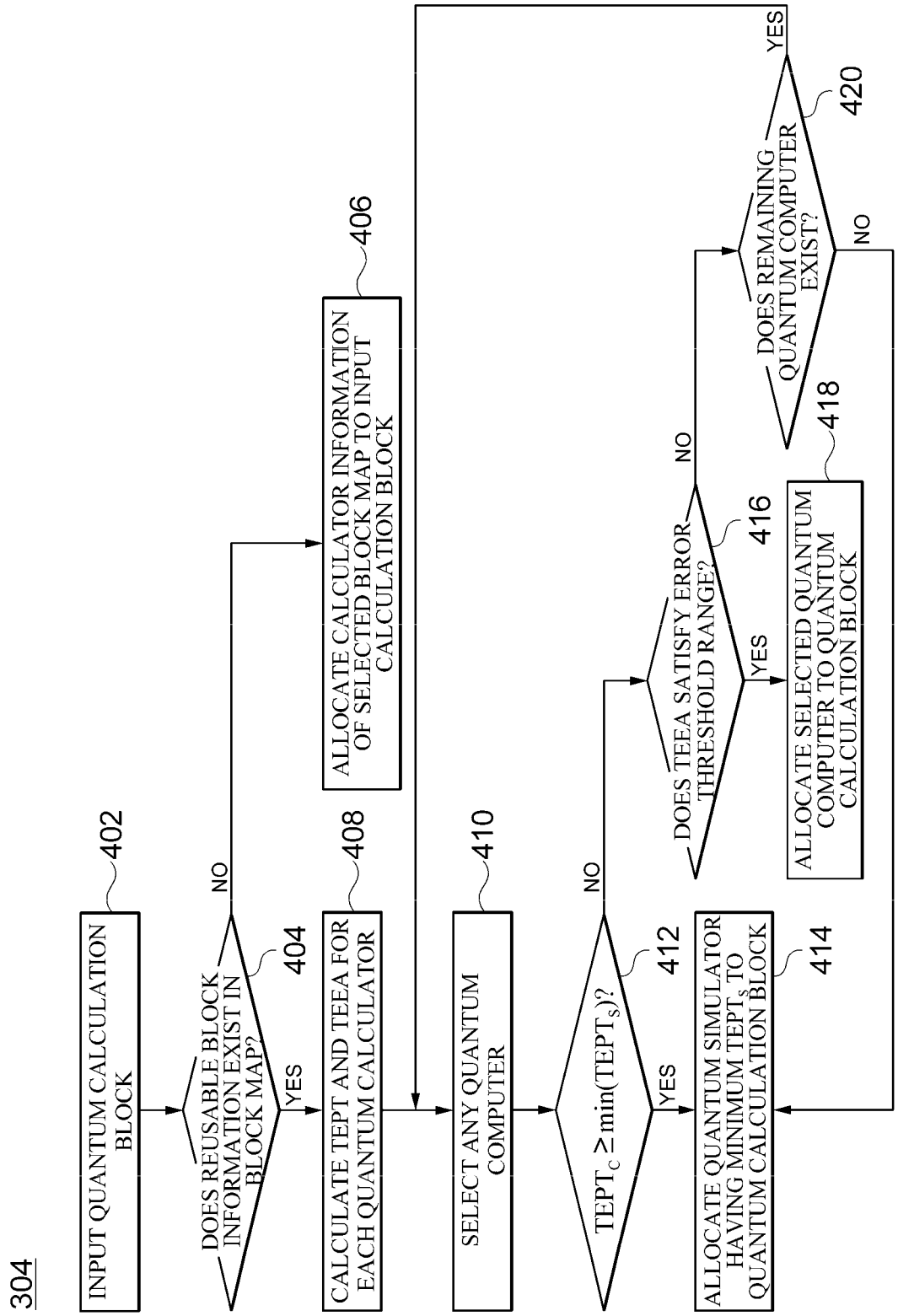
FIG. 4 is a block diagram illustrating a detailed configuration of an optimum quantum calculator determination step according to an embodiment.

FIG. 4 is a flowchart for illustrating the optimum quantum calculator determining step 304 according to an embodiment in more detail.

In step 402, the calculator determination module 106 receives the quantum calculation block generated from the block generation module 102 as an input.

In step 404, the calculator determination module 106 searches for a quantum computation block map and determines whether previous quantum calculation block information that is reusable by being substantially the same as the input quantum computation block exists in the quantum computation block map.

When the previous quantum calculation block information that is reusable exists in the quantum computation block map as a result of the determination in step 404, the calculator determination module 106 determines calculator information included in the previous quantum block information as a quantum calculator, which is to execute the quantum calculation block, in step 406.

In contrast, when the previous quantum calculation block information that is reusable does not exist in the quantum computation block map as a result of the determination in step 404, the calculator determination module 106 calculates the processing prediction time (TEPT$_S$) of each quantum simulator, the processing prediction time (TEPT$_C$) of each quantum computer, and the error prediction amount (TEEA) of each quantum computer for the quantum calculation block, in step 408.

In step 410, the calculator determination module 106 selects any one of the one or more quantum computers.

In step 412, the calculator determination module 106 determines whether or not the processing prediction time ($TEPT_C$) of the selected quantum computer is equal to or greater than a minimum value of the processing prediction time ($TEPT_S$) of each of the one or more quantum simulators.

When the processing prediction time ($TEPT_C$) of the selected quantum computer is greater than or equal to the minimum value of the processing prediction time ($TEPT_S$) of each of the one or more quantum simulators as a result of the determination in step 412, the calculator determination module 106 determines a quantum simulator corresponding to the minimum value as a quantum calculator, which is to execute the quantum calculation block, in step 414.

In contrast, when the processing prediction time ($TEPT_C$) of the selected quantum computer that is less than the minimum value of the processing prediction time ($TEPT_S$) of each of the one or more quantum simulators as a result of the determination in step 412, the calculator determination module 106 determines whether or not the error prediction amount (TEEA) of the selected quantum computer satisfies the error threshold range (ETR), in step 416.

When the error prediction amount (TEEA) satisfies the error threshold range (ETR) as a result of the determination in step 416, the calculator determination module 106 determines the selected quantum computer as a quantum calculator, which is to execute the quantum calculation block, in step 418.

In contrast, when the error prediction amount (TEEA) does not satisfy the error threshold range (ETR) as a result of the determination in step 416, the calculator determination module 106 determines whether or not a selectable quantum computer remains, in step 420.

When a remaining quantum computer exists, the calculator determination module 106 returns to step 410, selects a new quantum computer, and re-executes step 412 and subsequent steps.

In contrast, when the remaining quantum computer does not exist, the calculator determination module 106 returns to step 414 and determines a quantum simulator corresponding to the minimum value as a quantum calculator which is to execute the quantum calculation block.

Figure 5:
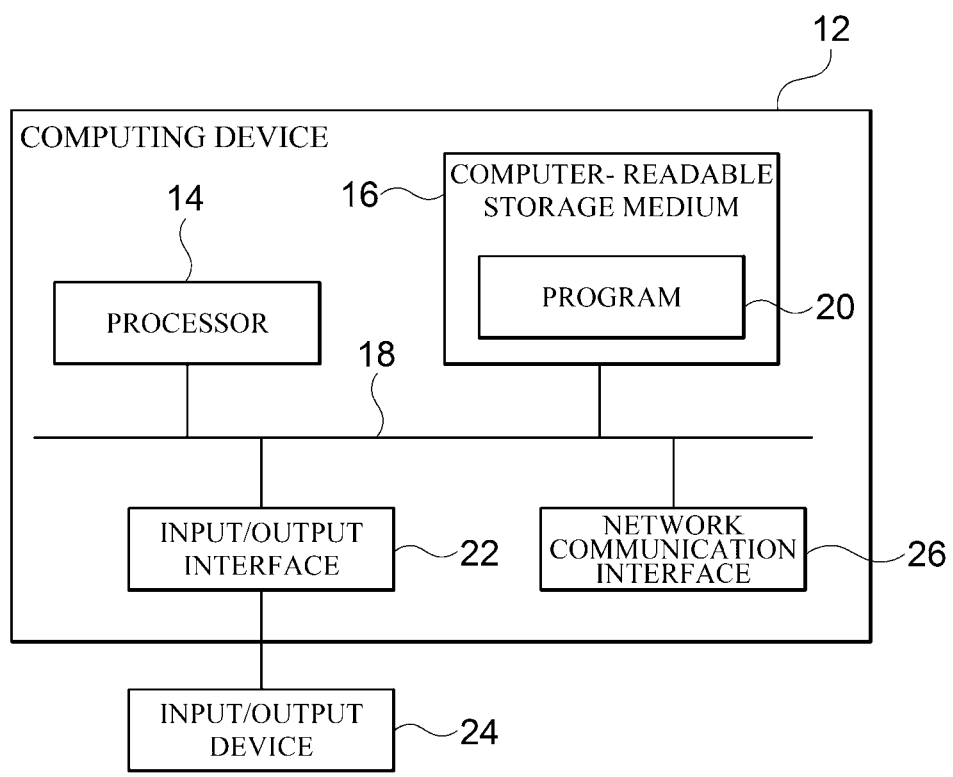
FIG. 5 is a block diagram for describing an example of a computing environment including a computing device suitable for use in exemplary embodiments.

FIG. 5 is a block diagram for describing an example of a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In one embodiment, the computing device 12 may be a quantum circuit configuration device 104 in accordance with the embodiments of the present invention. The computing device 12 includes at least one processor 14, a computer-readable storage medium 16, and a communication bus 18. The processor 14 may cause the computing device 12 to perform steps according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform steps according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash Memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or imaging devices, and/or output devices such as a display devices, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, the embodiment of the present invention may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and constructed for the present invention, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured to store and execute program instructions are included. Examples of the program may include high-level language code that can be executed by a computer using an interpreter, etc., as well as machine language code generated by a compiler.

Although the exemplary embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

Meanwhile, the embodiment of the present invention may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and constructed for the present invention, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured to store and execute program instructions are included. Examples of the program may include high-level language code that can be executed by a computer using an interpreter, etc., as well as machine language code generated by a compiler.

Although the exemplary embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

The invention claimed is:

1. An apparatus for optimizing quantum computation comprising:
   a block generation module that identifies a portion requiring quantum computation from an input problem and generates a quantum calculation block from the identified portion;
   a block map management module that stores and manages a quantum computation block map including the generated quantum calculation block information; and
   a calculator determination module that determines a quantum calculator, which is to execute the quantum calculation block, among a plurality of quantum calculators including one or more quantum simulators and one or more quantum computers.

2. The apparatus of claim 1, wherein the quantum calculation block information includes a type of quantum computation connection information with other quantum calculation blocks, an expired time, and quantum calculator information, which is to execute the quantum calculation block, that are included in the quantum calculation block.

3. The apparatus of claim 1, wherein, when previous quantum calculation block information substantially the same as the quantum calculation block exists in the quantum computation block map, the calculator determination module determines calculator information included in the previous quantum block information as a quantum calculator which is to execute the quantum calculation block.

4. The apparatus of claim 3, wherein, when the previous quantum calculation block information substantially the same as the quantum calculation block does not exist in the quantum computation block map, the calculator determination module calculates processing prediction time ($TEPT_S$) of each of the one or more quantum simulators, processing prediction time ($TEPT_C$) of each of the one or more quantum computers, and an error prediction amount (TEEA) of each of the one or more quantum computers for the quantum calculation block.

5. The apparatus of claim 4, wherein the calculator determination module selects any one of the one or more quantum computers and, when the processing prediction time ($TEPT_C$) of the selected quantum computer is equal to or greater than a minimum value of the processing prediction time ($TEPT_S$) of each of the one or more quantum simulators, determines the quantum simulator corresponding to the minimum value as a quantum calculator which is to execute the quantum calculation block.

6. The apparatus of claim 5, wherein, when the processing prediction time ($TEPT_C$) of the selected quantum computer is less than the minimum value of the processing prediction time ($TEPT_S$) of each of the one or more quantum simulators, the calculator determination module determines whether or not the error prediction amount (TEEA) of the selected quantum computer satisfies an error threshold range.

7. The apparatus of claim 6, wherein, when the determination result satisfies the error threshold range, the calculator determination module determines the selected quantum computer as a quantum calculator which is to execute the quantum calculation block.

8. The apparatus of claim 6, wherein, when the determination result does not satisfy the error threshold range, the calculator determination module reselects one of the remaining quantum computers and compares the processing prediction time ($TEPT_C$) of the reselected quantum computer with the minimum value of the processing prediction time ($TEPT_S$) of each of the one or more quantum simulators.

9. The apparatus of claim 8, wherein, when the quantum computer to be reselected does not exist, the calculator determination module determines the quantum simulator corresponding to the minimum value as a quantum calculator which is to execute the quantum calculation block.

10. A method for optimizing quantum computation, as a method performed in a computing device including one or more processors and a memory storing one or more programs executed by the one or more processors, the method comprising:
    identifying a portion requiring quantum computation from an input problem and generating a quantum calculation block from the identified portion;
    determining a quantum calculator, which is to execute the quantum calculation block, among a plurality of quantum calculators including one or more quantum simulators and one or more quantum computers; and
    recording quantum calculation block information including the determined quantum calculator information in a quantum computation block map.

11. The method of claim 10, wherein the quantum calculation block information includes a type of quantum computation, connection information with other quantum calculation blocks, an expired time, and information of a quantum calculator, which is to execute the quantum calculation block, that are included in the quantum calculation block.

12. The method of claim 10, wherein, in the determining of the quantum calculator, when previous quantum calculation block information substantially the same as the quantum calculation block exists in the quantum computation block map, calculator information included in the previous quantum block information is determined as a quantum calculator which is to execute the quantum calculation block.

13. The method of claim 12, wherein the determining of the quantum calculator further includes, when the previous quantum calculation block information substantially the same as the quantum calculation block does not exist in the quantum computation block map, calculating processing prediction time ($TEPT_S$) of each of the one or more quantum simulators, processing prediction time ($TEPT_C$) of each of the one or more quantum computers, and an error prediction amount (TEEA) of each of the one or more quantum computers for the quantum calculation block.

14. The method of claim 13, wherein the determining of the quantum calculator is configured such that any one of the one or more quantum computers is selected and, when the processing prediction time (TEPT$_C$) of the selected quantum computer is equal to or greater than a minimum value of the processing prediction time (TEPT$_S$) of each of the one or more quantum simulators, the quantum simulator corresponding to the minimum value is determined as a quantum calculator which is to execute the quantum calculation block.

15. The method of claim 14, wherein the determining of the quantum calculator is configured such that, when the processing prediction time (TEPT$_C$) of the selected quantum computer is less than the minimum value of the processing prediction time (TEPT$_S$) of each of the one or more quantum simulators, it is determined whether or not the error prediction amount (TEEA) of the selected quantum computer satisfies an error threshold range.

16. The method of claim 15, wherein the determining of the quantum calculator is configured such that, when the determination result satisfies the error threshold range, the selected quantum computer is determined that as a quantum calculator which is to execute the quantum calculation block.

17. The method of claim 15, wherein the determining of the quantum calculator is configured such that, when the determination result does not satisfy the error threshold range, one of the remaining quantum computers is reselected and the processing prediction time (TEPT$_C$) of the reselected quantum computer is compared with the minimum value of processing prediction time (TEPT$_S$) of each of the one or more quantum simulators.

18. The method of claim 17, wherein the determining of the quantum calculator is configured such that, when the quantum computer to be reselected does not exist, the quantum simulator corresponding to the minimum value is determined as a quantum calculator which is to execute the quantum calculation block.

* * * * *